US007703959B2

(12) United States Patent
Nakada et al.

(10) Patent No.: US 7,703,959 B2
(45) Date of Patent: Apr. 27, 2010

(54) LAMP UNIT OF VEHICLE HEADLAMP

(75) Inventors: Yusuke Nakada, Shizuoka (JP); Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 72 days.

(21) Appl. No.: 12/054,976

(22) Filed: Mar. 25, 2008

(65) Prior Publication Data

US 2008/0239742 A1 Oct. 2, 2008

(30) Foreign Application Priority Data

Mar. 26, 2007 (JP) ............................ 2007-079027

(51) Int. Cl.
*B60Q 1/00* (2006.01)

(52) U.S. Cl. ........................ 362/507; 362/516; 362/538

(58) Field of Classification Search ................. 362/507, 362/538, 389, 545, 516, 517, 518, 520, 521, 362/522
See application file for complete search history.

(56) References Cited

U.S. PATENT DOCUMENTS 4,686,610 A * 8/1987 Cibie et al. ................. 362/517
5,526,248 A * 6/1996 Endo .......................... 362/538
6,543,910 B2 * 4/2003 Taniuchi et al. ............. 362/297

(Continued)

FOREIGN PATENT DOCUMENTS

JP 2005-166590 6/2005

(Continued)

OTHER PUBLICATIONS

Patent Abstracts of Japan, Publication No. 2005-166590 dated Jun. 23, 2005, 2 pages.

(Continued)

*Primary Examiner*—Gunyoung T Lee
(74) *Attorney, Agent, or Firm*—Osha • Liang LLP

(57) ABSTRACT

A lamp unit of a vehicle lamp includes a projection lens arranged on an optical axis extending in the longitudinal direction of a vehicle, a light-emitting element arranged so as to face upward behind a rear focal point of the projection lens and in the vicinity of the optical axis, a reflector arranged so as to cover the light-emitting element from above and to reflect light from the light-emitting element forward toward the optical axis, and a mirror member disposed between the reflector and the projection lens. The mirror member includes an upward reflecting surface that upward reflects a portion of the reflected light from the reflector, and a front end edge formed so as to pass through the rear focal point of the projection lens. A region of the upward reflecting surface located nearer a self-lane side than the optical axis includes a first horizontal plane including the optical axis. A region of the upward reflecting surface located nearer an opposite-lane side than the optical axis includes a middle slope extending obliquely downward from the optical axis and a second horizontal plane extending parallel to the first horizontal plane from a lower end edge of the middle slope. A diffusing and reflecting portion that diffuses and reflects the reflected light from the reflector is formed in a position of the middle slope that is apart from the front end edge of the upward reflecting surface to a rear side.

18 Claims, 7 Drawing Sheets

U.S. PATENT DOCUMENTS

| | | | | |
|---|---|---|---|---|
| 7,341,366 | B2 * | 3/2008 | Iwasaki | 362/538 |
| 2005/0122737 | A1 | 6/2005 | Watanabe et al. | |

FOREIGN PATENT DOCUMENTS

| | | |
|---|---|---|
| JP | 2006-114274 | 4/2006 |

OTHER PUBLICATIONS

Patent Abstracts of Japan, Publication No. 2006-114274 dated Apr. 27, 2006, 2 pages.
German Office Action for Application No. 10 2008 015 246.3-54, mailed on Jul. 23, 2009 (6 pages).

* cited by examiner

LAMP UNIT OF VEHICLE HEADLAMP

This application claims foreign priority from Japanese Patent Application No. 2007-079027 filed on Mar. 26, 2007, the entire contents of which are hereby incorporated by reference.

BACKGROUND OF THE INVENTION

1. Field of the Invention

The present invention relates to a lamp unit of a vehicle headlamp, and particularly, relates to a projector-type lamp unit that uses a light-emitting element as a light source.

2. Related Art

In recent years, even in vehicle headlamps, lamp units that use a light-emitting element, such as a light-emitting diode, as a light source have been adopted.

For example, Patent Document 1 discloses a so-called projector-type lamp unit including a projection lens arranged on an optical axis extending in the longitudinal direction of a vehicle, a light-emitting element arranged so as to face upward behind a rear focal point of the projection lens and in the vicinity of the optical axis, and a reflector arranged so as to cover the light-emitting element from above and to reflect the light from the light-emitting element forward toward the optical axis.

In such a case, in the lamp unit disclosed in Patent Document 1, a mirror member that has an upward reflecting surface that upward reflects a portion of the reflected light from the reflector and has a front end edge formed so as to pass through the rear focal point of the projection lens is provided between the reflector and the projection lens. A portion of the reflected light from the reflector is reflected upward by the mirror member, thereby forming a light distribution pattern for low beams that has a cut-off line as an inverted projection image of a front end edge of the upward reflecting surface at its upper end.

Moreover, Patent Document 2 discloses a projector-type lamp unit in which, as the upward reflecting surface of the mirror member, a region located nearer the self-lane side than the optical axis is constituted with a first horizontal plane including the optical axis, and a region located nearer the opposite-lane side than the optical axis is constituted with a middle slope extending obliquely downward from the optical axis, and a second horizontal plane extending parallel to the first horizontal plane from a lower end edge of the middle slope.

[Patent Document 1] JP-A-2005-166590

[Patent Document 2] JP-A-2006-114274

SUMMARY OF THE INVENTION

In the projector-type lamp unit provided with a mirror member that is disclosed in the above Patent Document 1 and Patent Document 2, a light distribution pattern for low beams that has clear cut-off lines at its upper end can be formed while the utilization efficiency of the light from the light-emitting element can be enhanced.

If the upward reflecting surface of the mirror member is constituted with the first horizontal plane, the middle slope, and the second horizontal plane as disclosed in the above Patent Document 2 as the cut-off lines of the light distribution pattern for low beams, it is possible to provide cut-off lines with a right-and-left height difference such that a self-lane cut-off line is formed one-step higher than an opposite-lane cut-off line. Also, the end of the self-lane cut-off line on the side of the opposite-lane cut-off line is formed as an oblique cut-off line.

However, in the lamp unit having such a mirror member, the light distribution pattern formed by the light reflected by the middle slope in the upward reflecting surface of the mirror member will be formed so as to be obliquely interposed between two light distribution patterns formed by the light reflected by the first and second horizontal planes. Because of this, there is a problem in that the light distribution pattern formed by the reflected light from the mirror member is apt to cause light distribution unevenness of the light distribution pattern for low beams.

One or more embodiments of the invention provide a lamp unit of a vehicle headlamp capable of suppressing occurrence of light distribution unevenness when a light distribution pattern for low beams that has cut-off lines with a right-and-left height difference is formed by a projector-type lamp unit that uses a light-emitting element as a light source.

One or more embodiments of the invention include a configuration in which a mirror member that upward reflects a portion of the reflected light from a reflector is provided.

The lamp unit of a vehicle lamp according to one or more embodiments of the invention includes a projection lens arranged on an optical axis extending in the longitudinal direction of a vehicle, a light-emitting element that is arranged so as to face upward behind a rear focal point of the projection lens and in the vicinity of the optical axis, and a reflector that is arranged so as to cover the light-emitting element from above and to reflect the light from the light-emitting element forward toward the optical axis. A mirror member that has an upward reflecting surface that upward reflects a portion of the reflected light from the reflector and has a front end edge formed so as to pass through the rear focal point of the projection lens is provided between the reflector and the projection lens. A region of the upward reflecting surface located nearer the self-lane side than the optical axis is constituted with a first horizontal plane including the optical axis, and a region of the upward reflecting surface located nearer the opposite-lane side than the optical axis is constituted with a middle slope extending obliquely downward from the optical axis, and a second horizontal plane extending parallel to the first horizontal plane from a lower end edge of the middle slope. A diffusing and reflecting portion that diffuses and reflects the reflected light from the reflector is formed in the position of the middle slope that is apart from the front end edge of the upward reflecting surface to the rear side.

The above "light-emitting element" means a light source in the shape of an element that has a light-emitting chip that surface-emits light substantially in the shape of a point. The type of the light-emitting element is not particularly limited. For example, a light emitting diode, a laser diode, etc. can be adopted. Further, although the "light-emitting element" is arranged so as to face upward in the vicinity of the optical axis, the light-emitting element is not necessarily arranged so as to face vertically upward.

The diffusing and reflecting portion is not particularly limited in its actual configuration so long as it is configured so as to diffuse and reflect the reflected light from a reflector. Further, even as for the formation position of the "diffusing and reflecting portion," the specific position of the diffusing and reflecting portion is not particularly limited so long as it is a "position apart from the front end edge of the upward reflecting surface to the rear side."

The lamp unit of a vehicle headlamp according to one or more embodiments is constituted as a projector-type lamp unit that uses the light-emitting element as a light source. However, the mirror member that has the upward reflecting surface that upward reflects a portion of the reflected light from the reflector and that is formed so that the front end edge of the upward reflecting surface may pass through the rear focal point of the projection lens is provided between the reflector and the projection lens. Thus, it is possible to form the light distribution pattern for low beams that has clear cut-off lines at its upper end while the utilization efficiency of the light from the light-emitting element can be enhanced.

Because a region of the upward reflecting surface on the side of the self-lane is constituted with a first horizontal plane including the optical axis, and a region of the upward reflecting surface on the side of the opposite lane is constituted with a middle slope extending obliquely downward from the optical axis, and a second horizontal plane extending parallel to the first horizontal plane from a lower end edge of the middle slope, but a diffusing and reflecting portion that diffuses and reflects the reflected light from the reflector is formed in the position of the middle slope that is apart from the front end edge of the upward reflecting surface to the rear side, the following operation effects can be obtained.

The light distribution pattern formed by the light reflected by the middle slope in the upward reflecting surface of the mirror member is formed so as to be obliquely interposed between the two light distribution patterns formed by the light reflected by the first and second horizontal planes. However, a portion of the middle slope is formed as the diffusing and reflecting portion. Thus, by widening the light distribution pattern formed by the reflected light from the middle slope, the brightness of the pattern can be reduced. Accordingly, it is possible to reduce the probability that light distribution unevenness may be caused in the light distribution pattern for low beams by a light distribution pattern formed by the reflected light from the mirror member.

Because the diffusing and reflecting portion is formed in a position apart from the front end edge of the upward reflecting surface in the middle slope to the rear side, occurrence of light distribution unevenness can be suppressed, without causing a hindrance to the formation of the cut-off lines.

As described above, according to one or more embodiments, when the light distribution pattern for low beams that has the cut-off lines with a right-and-left height difference is formed by the projector-type lamp unit that uses the light-emitting element as a light source, occurrence of light distribution unevenness can be suppressed.

The diffusing and reflecting portion is formed so as to extend to the first and second horizontal planes such that it bridges over the middle slope in the vehicle width direction. Thus, the light distribution pattern formed by the reflected light from a portion of the middle slope and the light distribution pattern formed by the reflected light from a portion of each of the first and second horizontal planes can be made to partially overlap each other while the brightness of the patterns can be reduced. This makes it possible to effectively suppress occurrence of light distribution unevenness.

If the diffusing and reflecting portion is configured by forming a plurality of grooves extending in the longitudinal direction of a vehicle so as to be adjacent to one another in the vehicle width direction, the reflected light from each of the grooves can be made into horizontally diffused light. Because of this, a light distribution pattern formed by the reflected light from a portion of the middle slope (or in addition to this, a light distribution pattern formed by the reflected light by a portion of each of the first and second horizontal planes) can be made into a laterally long light distribution pattern. This makes it possible to more effectively suppress occurrence of light distribution unevenness.

If each of the grooves located in the middle slope among the plurality of grooves has an upward slope that is inclined to the side opposite the middle slope, the following operation effects can be obtained.

If the diffusing and reflecting portion is not formed, a gap will be formed between the light distribution pattern formed by the reflected light from the first horizontal plane, and the light distribution pattern formed by the reflected light from the middle slope and the gap portion will become a dark portion. On the other hand, if the groove located in the middle slope is configured so as to have the upward slope that is inclined to the side opposite to the middle slope, the reflected light from the upward slope of the groove can be diffused in a direction nearer the light distribution pattern formed by the reflected light from the first horizontal plane. This can prevent a gap from being formed with respect to the light distribution pattern formed by the reflected light from the middle slope. Thus, the gap portion can be prevented from becoming a dark portion. This makes it possible to more effectively suppress occurrence of light distribution unevenness.

In addition, in this case, as the groove located in the middle slope, a single groove or a plurality of grooves may be provided.

Moreover, if, among the plurality of grooves, each of the grooves located in the first horizontal plane has an upward slope that is inclined to the side opposite the middle slope, and each of the grooves located in the second horizontal plane has an upward slope that is inclined to the same side as the middle slope, the following operation effects can be obtained.

In the reflected light from the reflector, the reflected light from a reflection region in a position apart from the optical axis in the vehicle width direction will have a large incident angle to the upward reflecting surface of the mirror member in plan view. In such a case, the reflected light from the reflection region of the reflector that is located on the side of the first horizontal plane with respect to the optical axis mainly enters the first horizontal plane, and the reflected light from the reflection region of the reflector located on the side of the second horizontal plane with respect to the optical axis mainly enters the second horizontal plane. Thus, by constituting each groove located in the first horizontal plane as a groove having the upward slope that is inclined to the side opposite the middle slope, and by constituting each groove located in the second horizontal plane as a groove having the upward slope that is inclined to the same side as the middle slope, the reflected light can be made to enter the projection lens irrespective of whether the reflected light from each of the grooves becomes horizontally diffused light. This makes it possible to suppress occurrence of a light distribution pattern as well as to effectively utilize the luminous flux of a light source.

The formation position of the "diffusing and reflecting portion" is not particularly limited as described above. In one or more embodiments, if the position of the front end edge of the diffusing and reflecting portion is set to a position of 1 to 4 mm from the rear focal point of the projection lens, the light that is directed to a relatively short-distance region (that is, a region where light distribution unevenness is conspicuous) in the frontal direction of a vehicle can be diffused. Thus, occurrence of light distribution unevenness can be suppressed effectively. Further, because the portion of the upward deflecting surface located in front of the diffusing and reflecting portion ensures the function as the upward deflecting surface, occurrence of light distribution unevenness can be suppressed while the cut-off lines formed from the front end edge of the upward reflecting surface can be formed clearly.

Other aspects and advantages of the invention will be apparent from the following description, the drawings and the claims.

DETAILED DESCRIPTION OF THE EXEMPLARY EMBODIMENTS

Hereinafter, embodiments of the invention will be described with reference to the accompanying drawings.

Figure 1:
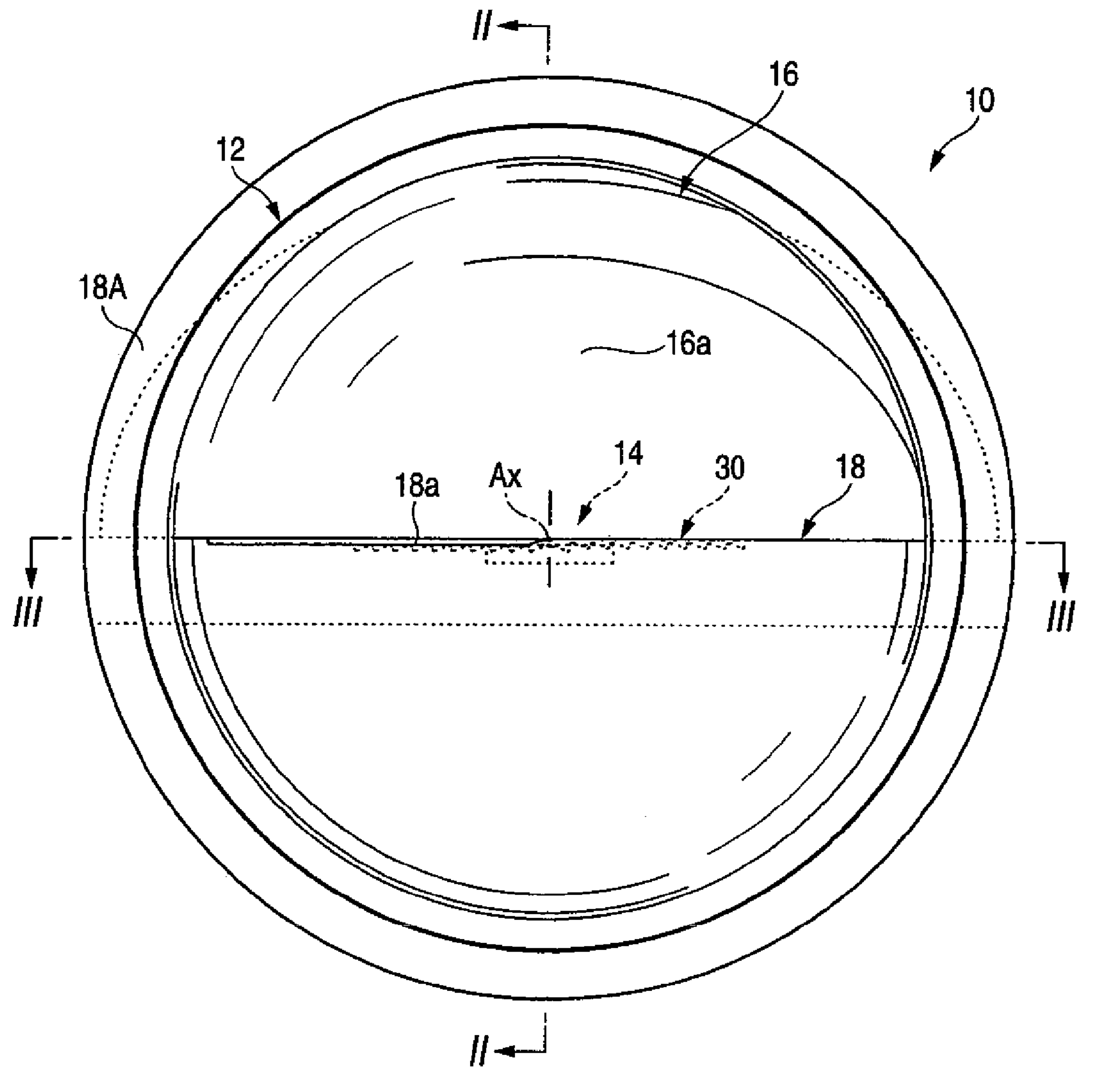
FIG. 1 is a front view showing a lamp unit of a vehicle headlamp according to one embodiment of the invention.
Figure 2:
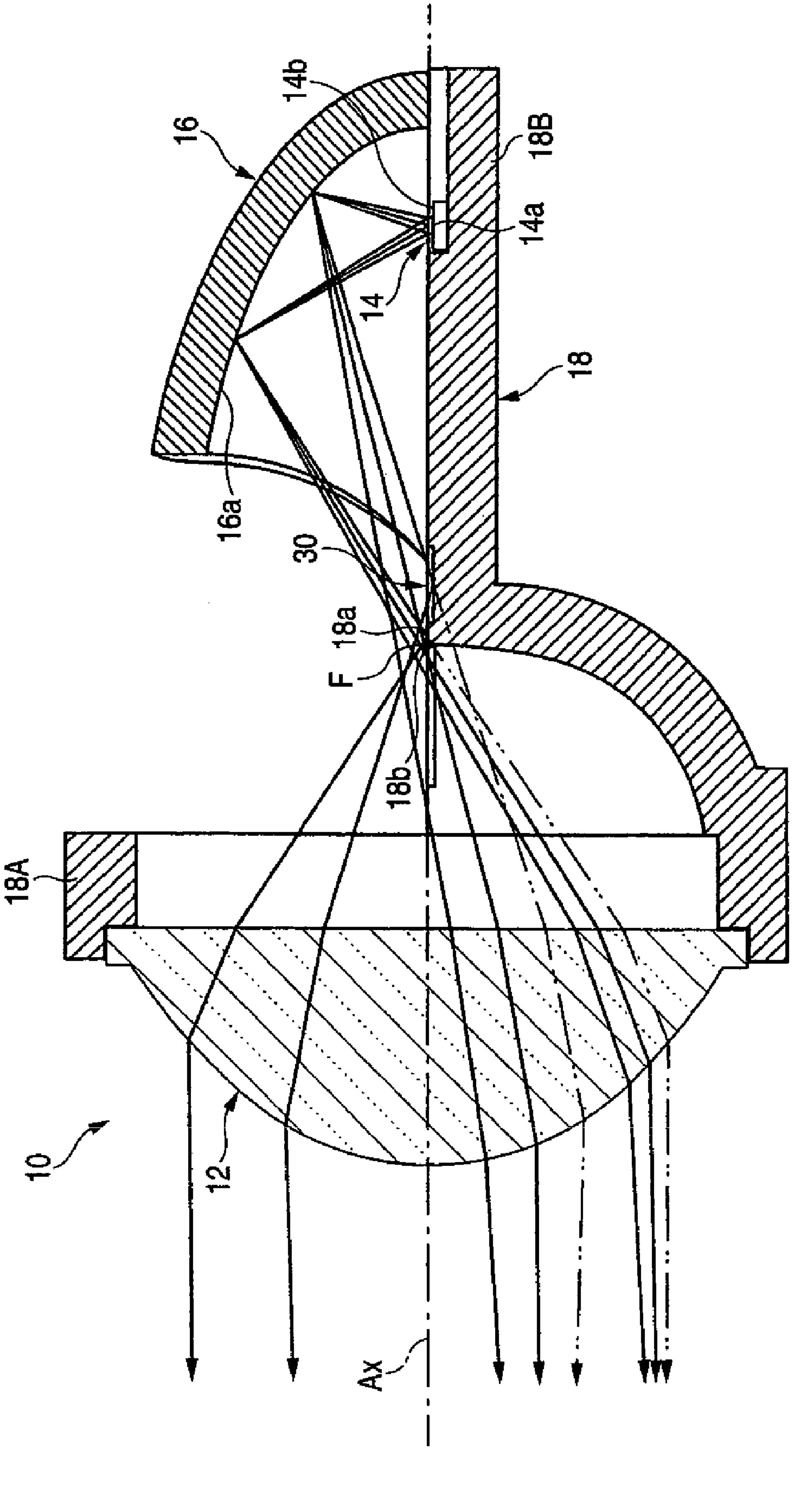
FIG. 2 is a sectional view taken along the line II-II of FIG. 1.
Figure 3:
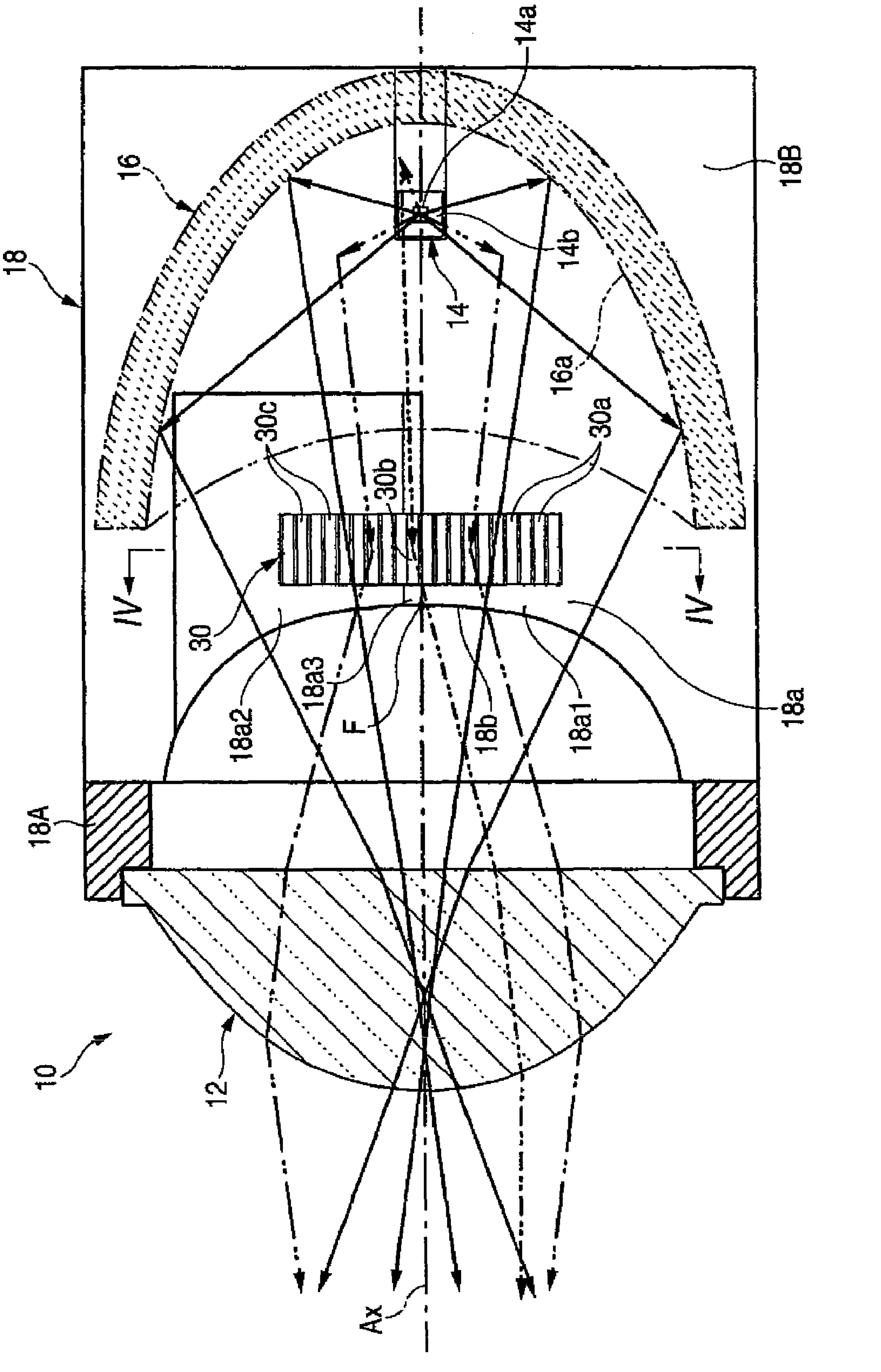
FIG. 3 is a sectional view taken along the line III-III of FIG. 1.

FIG. 1 is a front view showing a lamp unit 10 according to one embodiment of the invention. Further, FIG. 2 is a sectional view taken along the line II-II of FIG. 1, and FIG. 3 is a sectional view taken along the line III-III of FIG. 1.

As shown in these drawings, lamp unit 10 includes a projection lens 12 arranged on an optical axis Ax extending in the longitudinal direction of a vehicle, a light-emitting element 14 arranged behind a rear focal point F of the projection lens 12, a reflector 16 arranged so as to cover the light-emitting element 14 from above and deflects the light from the light-emitting element 14 forward toward the optical axis Ax, and a mirror member 18 arranged between the reflector 16 and the projection lens 12, which reflects a portion of the reflected light from the reflector 16 upward.

The lamp unit 10 is adapted to be used in a state where it is incorporated as a portion of a vehicle headlamp. In the state where the lamp unit is incorporated into the vehicle headlamp, the lamp unit is arranged in a state where the optical axis Ax thereof extends in a downward direction of about 0.5 to 0.6° with respect to the longitudinal direction of a vehicle. Also, the lamp unit 10 performs optical irradiation for forming a light distribution pattern for low beams of left light distribution.

The projection lens 12 includes a planoconvex aspheric lens whose front surface is a convex surface and whose rear surface is a plane surface, and is adapted to project a light source image formed on a rear focal plane (that is, a focal plane including rear focal point F) onto a virtual vertical screen ahead of the lamp as an inverted image. The projection lens 12 is fixed to a ring-shaped lens holder 18A formed integrally with the mirror member 18 such that it is located ahead of the mirror member 18.

The light-emitting element 14 is a white light diode, and is composed of a light-emitting chip 14*a* having a square light-emitting surface of about 1 mm×1 mm, and a substrate 14*b* that supports the light-emitting chip 14*a*. The light-emitting chip 14*a* is sealed by a thin film formed so as to cover the light-emitting surface. Also, the light-emitting element 14 is positioned and fixed in a recessed portion formed in an upper surface of a rear extension portion 18B that is formed to extend rearward from the mirror member 18 in a state where the light-emitting chip 14*a* is arranged so as to face vertically upward on the optical axis Ax.

A reflecting surface 16*a* of the reflector 16 is constituted with a curved surface substantially in the shape of an ellipsoid that has a major axis that is coaxial with the optical axis Ax, and uses the emission center of the light-emitting element 14 as a first focal point, and the eccentricity of the reflecting surface is set so as to increase gradually toward a horizontal cross section from a vertical cross section. Also, the reflecting surface 16*a* is configured so as to make the light from the light-emitting element 14 converge into a point located slightly ahead of the rear focal point F of the projection lens 12 in the vertical cross section, and to displace the converging position quite forward from the rear focal point F in the horizontal cross section. The reflector 16 is fixed to the upper surface of the rear extension portion 18B of the mirror member 18 at a peripheral lower end of the reflecting surface 16*a* thereof.

The mirror member 18 is constituted as a member in the shape of a substantially flat plate that extends in the horizontal direction, and the upper surface of the mirror member is constituted as an upward reflecting surface 18*a* extending rearward along the optical axis Ax from the rear focal point F. Also, the mirror member 18 reflects a portion of the reflected light from the reflector 16 upward in the upward reflecting surface 18*a* thereof. Further, the upward reflecting surface 18*a* is formed by performing specular processing by aluminum evaporation, etc. on the upper surface of the mirror member 18.

A front end edge 18*b* of the upward reflecting surface 18*a* is formed so as to extend along the rear focal plane of the projection lens 12. That is, the front end edge 18*b* is formed in a curved manner so as to be displaced gradually forward toward both sides of the optical axis Ax from the rear focal point F in plan view.

As for the upward reflecting surface 18*a*, a left region that is located on the left side (on the right side in the front view of the lamp) nearer the self-lane than the optical axis Ax is constituted with a first horizontal plane 18*a*1 including the optical axis Ax, and a right region that is located on the right side nearer the opposite-lane than the optical axis Ax is constituted with a second horizontal plane 18*a*2 that is one-step lower than the left region via a middle slope 18*a*3 that extends obliquely downward from the optical axis. The right end and the rear extension portion 18B that are sufficiently apart from the rear focal point F in the right region are formed so as to be flush with the first horizontal plane 18*a*1 that constitutes the left region. The downward inclination angle of the middle slope 18*a*3 is set to 15°, and the second horizontal plane 18*a*2 is formed so as to be located about 0.4 mm below the first horizontal plane 18*a*1.

As shown in FIGS. 2 and 3, the light from the light-emitting element 14 reflected by the reflecting surface 16*a* of the reflector 16 is reflected forward toward the optical axis Ax and enters a lower region of the projection lens 12. A portion of the light enters the upward reflecting surface 18*a* of the mirror member 18, is reflected by the upward reflecting surface 18*a*, and then enters an upper region of the projection lens 12.

Then, the light that has entered the lower region or upper region of the projection lens 12 is emitted forward as downward light from the projection lens 12.

Further, a diffusing and reflecting portion 30 that diffuses and reflects the reflected light from the reflector 16 is formed in the position of the upward reflecting surface 18*a* that is apart from the front end edge 18*b* to the rear side.

Figure 4:
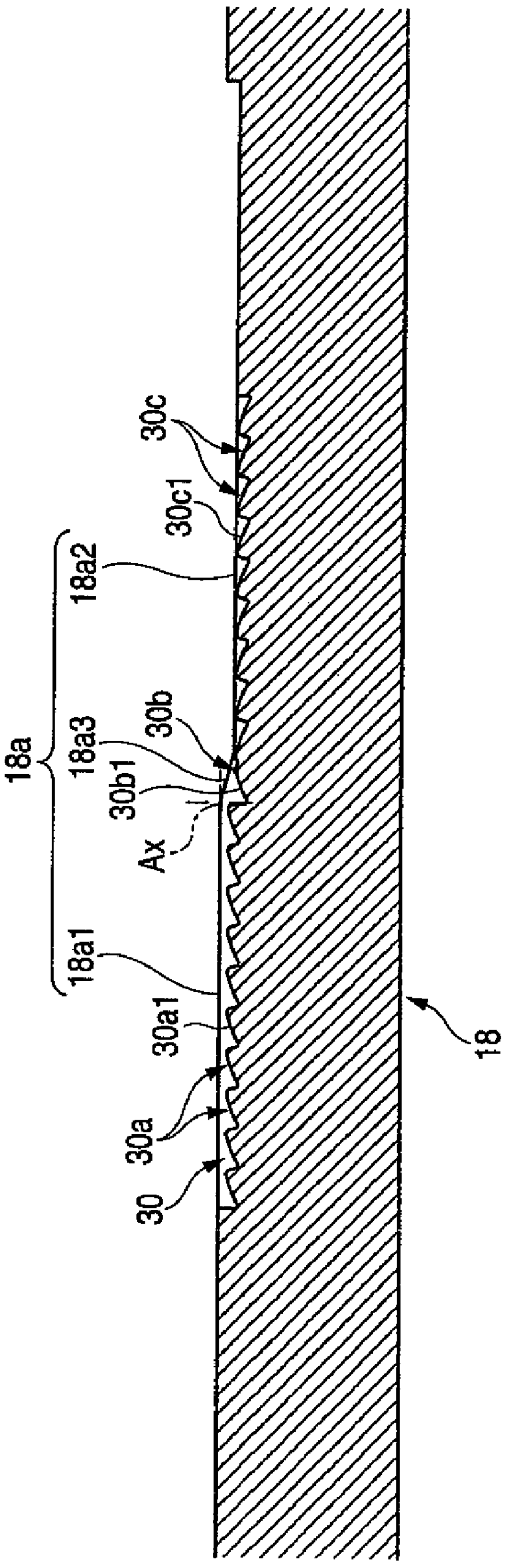
FIG. 4 is a detailed sectional view taken along the line IV-IV of FIG. 3.
Figure 5:
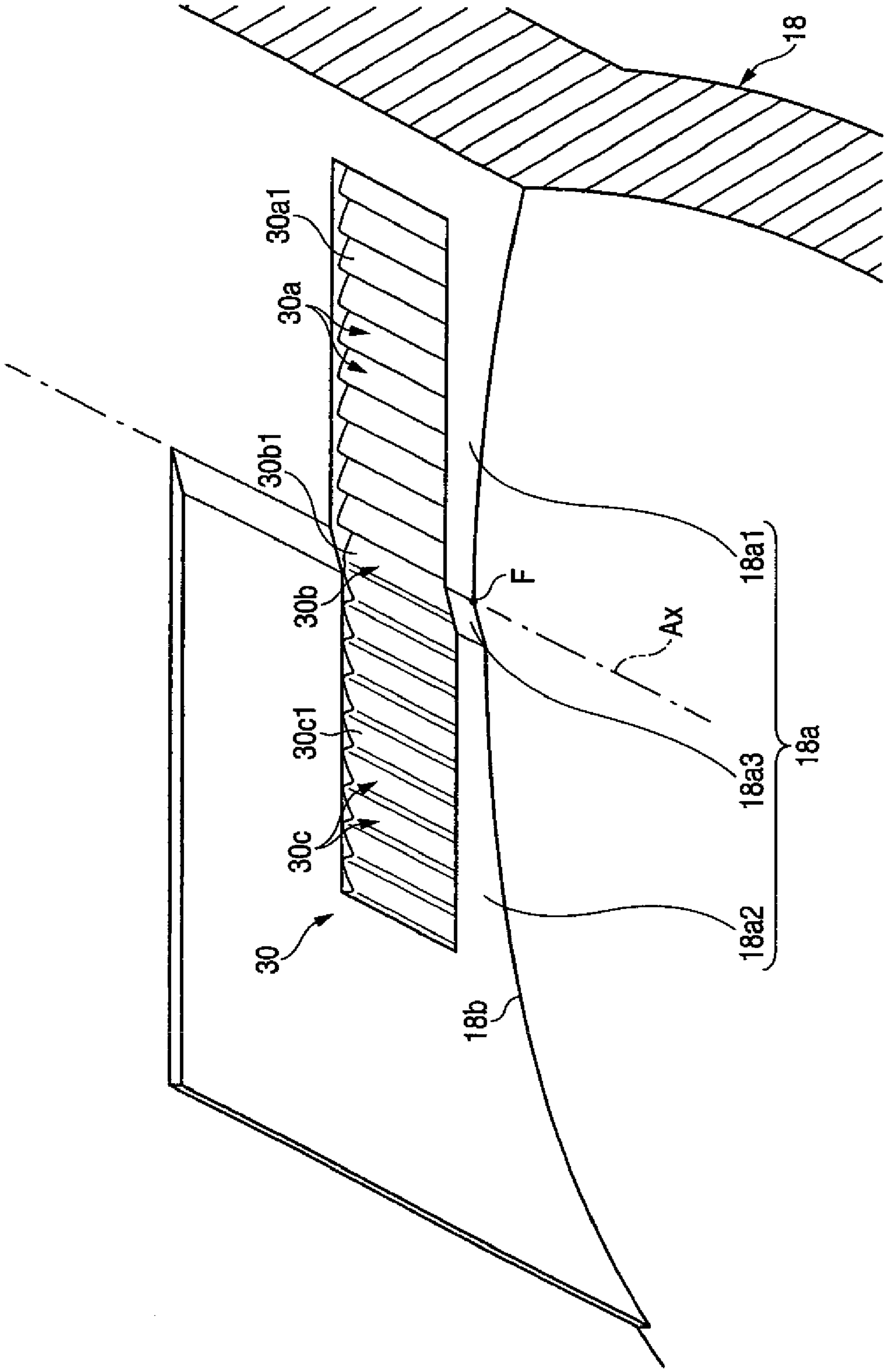
FIG. 5 is a perspective view when the diffusing and reflecting portion of the lamp unit is seen from the oblique upper front left direction.

FIG. 4 is a detailed sectional view taken along the line IV-IV of FIG. 3. Further, FIG. 5 is a perspective view when the diffusing and reflecting portion 30 is seen from the oblique front left upper direction.

As shown in these drawings, the diffusing and reflecting portion 30 is formed about the optical axis Ax so as to extend to the first and second horizontal planes 18*a*1 and 18*a*2 such that it bridges over the middle slope 18*a*3 of the upward reflecting surface 18*a* in the vehicle width direction. Specifically, the diffusing and reflecting portion 30 is formed in a laterally long rectangular region that is 15 to 25 mm (for example, 20 mm) in right-and-left width, and 5 to 10 mm (for example, 7 mm) in front-and-rear width, and the position of the front end edge thereof is set to a position of 1 to 4 mm (for example, 2 mm) from the rear focal point F.

The diffusing and reflecting portion 30 is configured by forming a plurality of grooves 30*a*, 30*b*, and 30*c* extending in the front and rear directions so as to be adjacent to one another in the vehicle width direction. In one or more embodiments, as the plurality of grooves 30*a*, 30*b*, and 30*c*, ten grooves are formed on both sides of the optical axis Ax, respectively, i.e., a total of twenty grooves are formed.

In such a case, ten grooves 30*a* formed on the left side of the optical axis Ax are located in the first horizontal plane 18*a*1, one groove 30*b* formed immediately on the right side of the optical axis Ax is located in the middle slope 18*a*3, and nine grooves 30*c* formed on the right side of the optical axis side are located in the second horizontal plane 18*a*2.

All ten grooves 30*a* are formed in the same cross-sectional shape and are arranged in a substantially serrated shape. Each of the grooves 30*a* has an upward slope (that is, inclined to the side opposite the middle slope 18*a*3) 30*a*1 that is inclined in the upper left direction and the cross-sectional shape thereof is set in the shape of an upward circular arc. Also, each of the grooves 30*a* is formed so that the upper end edge of the upward slope 30*a*1 may be located slightly below the first horizontal plane 18*a*1.

Because the ten grooves 30*a* are located on the left side of the optical axis Ax, the light from the light-emitting element 14 reflected mainly in the region of the reflecting surface 16*a* of the reflector 16 on the left side of the optical axis Ax will mainly enter each of the grooves 30*a* as rightward slanting light. However, because the upward slope 30*a*1 of each of the grooves 30*a* is inclined in the upper left direction, the light from the reflector 16 reflected by the upward slope 30*a*1 will enter the projection lens 12 positively, irrespective of whether it becomes horizontally diffused light.

On the other hand, nine grooves 30*e* are formed in the same cross-sectional shape and are arranged in a substantially serrated shape. Each of the grooves 30*c* has an upward slope (that is, inclined to the side opposite the middle slope 18*a*3) 30*c*1 that is inclined in the upper right direction, and the cross-sectional shape thereof is set in the shape of an upward circular arc. Also, each of the grooves 30*c* is formed so that the upper end edge of the upward slope 30*c*1 thereof may be located slightly below the second horizontal plane 18*a*2.

Because the nine grooves 30*e* are located on the right side of the optical axis Ax, the light from the light-emitting element 14 reflected mainly in the region on the right side of the optical axis Ax in the reflecting surface 16*a* of the reflector 16 will mainly enter each of the grooves 30*e* as leftward slanting light. However, because the upward slope 30*c*1 of each of the grooves 30*c* is inclined in the upper right direction, the light from the reflector 16 reflected by the upward slope 30*c*1 will enter the projection lens 12 positively, irrespective of whether it becomes horizontally diffused light.

The remaining one groove 30*b* has an upward slope (that is, inclined to the side opposite the middle slope 18*a*3) 30*b*1 that is inclined in the upper left direction and the cross-sectional shape thereof is set in the shape of an upward circular arc. Also, the groove 30*b* is formed so that the upper end edge of the upward slope 30*b*1 thereof may be located slightly below the second horizontal plane 18*a*2.

Because the groove 30*b* is in the position adjacent to the right side of the optical axis Ax, the light from the light-emitting element 14 in a region in the vicinity of the right side of the optical axis Ax in the reflecting surface 16*a* of the reflector 16 enters the groove 30*b* as the light substantially parallel to the optical axis Ax in plan view. However, because the upward slope 30*b*1 of the groove 30*b* is inclined to in the upper left direction, the light from the reflector 16 reflected by the upward slope 30*b*1 becomes the light that is diffused in the horizontal direction slightly near the left, the light enters the projection lens 12, and is emitted forward from the projection lens 12 as the light that is diffused in the horizontal direction slightly near the right.

Figure 6:
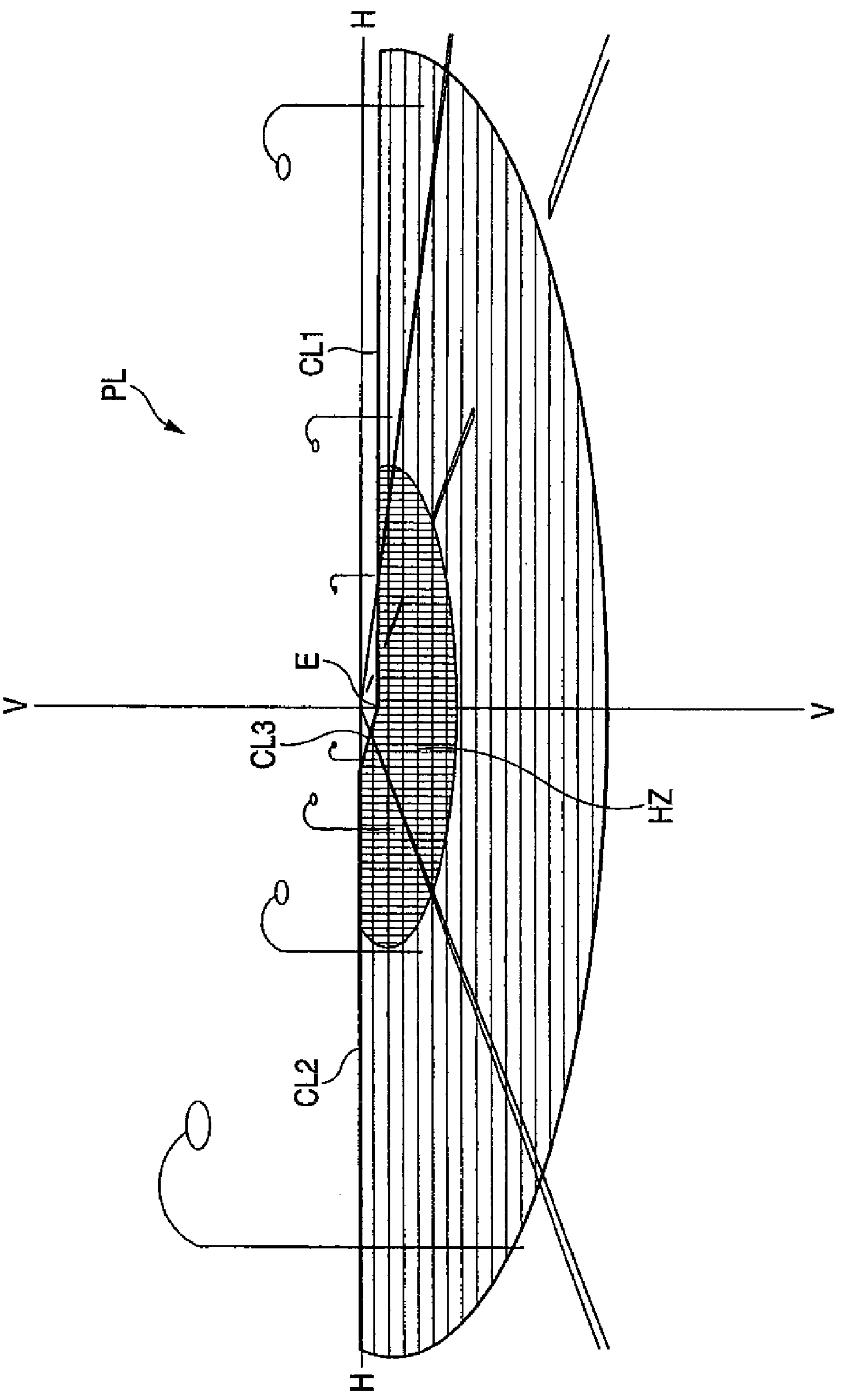
FIG. 6 is a perspective view showing a light distribution pattern for low beams formed on a virtual vertical screen, which is arranged in the position of 25 m ahead of a vehicle, by the light radiated forward from the lamp unit.

FIG. 6 is a perspective view showing a light distribution pattern PL for low beams formed on a virtual vertical screen, which is arranged in the position of 25 m ahead of a vehicle, by the light radiated forward from the lamp unit 10 according to one or more embodiments.

As shown in this drawing, the light distribution pattern P1 for low beams is a light distribution pattern for low beams of left light distribution and has cut-off lines CL1, CL2, and CL3 with a right-and-left height difference at its upper end edge.

The cut-off lines CL1, C-L2, and CL3 extend in the horizontal direction with a right-and-left height difference, with the line V-V that is a vertical line that passes through H-V that is a vanishing point ahead of the lamp as a borderline. On the right side of the line V-V, the cut-off line CL1 on the side of the opposite lane is formed so as to extend in the horizontal direction, and on the left side of the line V-V, the cut-off line CL2 on the side of the self-lane is formed so as to extend in the horizontal direction such that it is higher than the cut-off line CL1 on the side of the opposite lane. Also, the end of the self-lane cut cut-off line CL2 nearer the line V-V is formed as an oblique cut-off line CL3. The oblique cut-off line CL3 extends at an inclination angle of 15° obliquely in the upper left direction from the point of intersection between the opposite-lane cut-off line CL1 and the line V-V.

In this light distribution pattern PL for low beams, an elbow point E that is a point of intersection between the low-stage cut-off line CL1 and the line V-V is located about 0.5 to 0.6° below H-V. This is because the optical axis Ax extends in a downward inclined direction of about 0.5 to 0.6° with respect to the longitudinal direction of a vehicle. Also, in this light distribution pattern P1 for low beams, a hot zone HZ that is a high luminous-intensity region is formed so as to surround the elbow point E.

The light distribution pattern PL for low beams is formed by projecting an image of the light-emitting element 14, which is formed on the rear focal plane of the projection lens 12 by the light from the light-emitting element 14 reflected by the reflector 16, as an inverted projection image onto the above virtual vertical screen by means of the projection lens 12, and the cut-off lines CL1, CL2, and CL3 are formed as an inverted projection image of the front end edge 18*b* of the upward reflecting surface 18*a* of the mirror member 18.

In such a case, the light distribution pattern PL for low beams is a combined light pattern of a light distribution pattern formed by the light that has directly entered a lower region of the projection lens 12 in the light from the light-emitting element 14 reflected by the reflecting surface 16*a* of the reflector 16 and a light distribution pattern formed by the light that has entered an upper region of the projection lens 12 after being reflected by the upward reflecting surface 18*a* of the mirror member 18.

Figure 7:
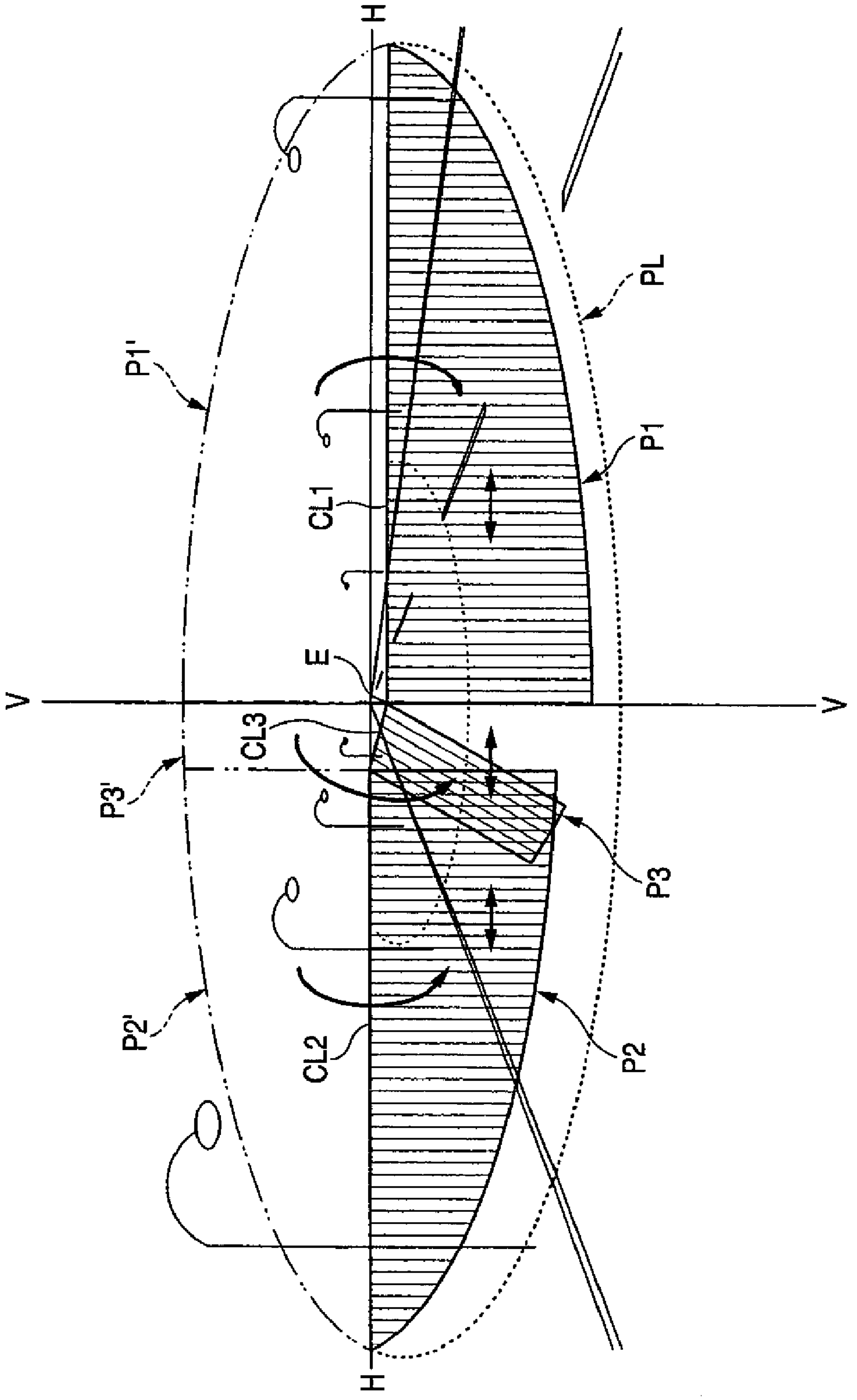
FIG. 7 is a view similar to FIG. 6, showing that three light distribution patterns formed by the light that is reflected by the upward reflecting surface of the mirror member and has entered the upper region of the projection lens are extracted from a plurality of light distribution patterns that constitute the light distribution pattern for low beams.

FIG. 7 is a view similar to FIG. 6, showing that three light distribution patterns P1, P2, and P3 formed by the light that is reflected by the upward reflecting surface 18*a* of the mirror member 18 and has entered the upper region of the projection lens 12 are extracted from a plurality of light distribution patterns that constitute the light distribution pattern PL for low beams.

In this drawing, the light distribution pattern P1 is a light distribution pattern formed by the light reflected by the first horizontal plane 18*a*1 in the upward reflecting surface 18*a* of the mirror member 18, the light distribution pattern P2 is a light distribution pattern formed by the light reflected by the second horizontal plane 18*a*2, and the light distribution pattern P3 is a light distribution pattern formed by the light reflected by the middle slope 18*a*3. The three light distribution patterns P1, P2, and P3 are light distribution patterns formed when the diffusing and reflecting portion 30 is not formed in the upward reflecting surface 18*a* of the mirror member 18.

Further, three light distribution patterns P1', P2', and P3' shown by two-dot chain lines in the drawing are light distribution pattern formed by the light that has directly entered the lower region of the projection lens 12 without being reflected by each of the first horizontal plane 18*a*1, the second horizontal plane 18*a*2, and the middle slope 18*a*3, if the mirror member 18 is not arranged. The three light distribution patterns P1', P2', and P3' will be formed above the cut-off line CL1, CL2, and CL3.

The light distribution pattern P1 becomes a light distribution pattern obtained by vertically inverting the light distribution pattern P1' located above the opposite-lane cut-off line CL1 with respect to the opposite-lane cut-off line CL1, the light distribution pattern P2 becomes a light distribution pattern obtained by vertically inverting the light distribution pattern P2' located above the self-lane cut-off line CL2 with the self-lane cut-off line CL2, and the light distribution pattern P3 becomes a light distribution pattern obtained by vertically inverting the light distribution pattern P3' located above the oblique cut-off line CL3 with respect to the oblique cut-off line CL3.

In such a case, because the oblique cut-off line CL3 extends at an inclination angle of 15° obliquely in the upper left direction, the light distribution pattern P3 is formed with respect to the light distribution patterns P1 and P2 located on both the right and left thereof so as to separate from the right light distribution pattern P1 and so as to partially overlap the left light distribution pattern P2.

Because of this, the gap between the light distribution pattern P1 and the light distribution pattern P3 will be formed as a dark portion. Moreover, because the dark portion can be formed so as to be adjacent to the right of a bright portion where the light distribution pattern P2 and the light distribution pattern P3 overlap each other, light distribution unevenness in a short-distance region in the frontal direction of a vehicle will occur in a road surface ahead of a vehicle.

However, in the lamp unit 10 according to one or more embodiments, the diffusing and reflecting portion 30 is formed in the upward reflecting surface 18*a* of the mirror member 18. Thus, occurrence of the above light distribution unevenness will be suppressed.

Because the middle slope 18*a*3 is formed with the groove 30*b* that causes the light from the reflector 16 that has entered the middle slope 18*a*3 to be reflected as the light that is diffused in the horizontal direction slightly to the left and to enter the projection lens 12, and that causes the light to be emitted forward as the light that is diffused in the horizontal direction slightly to the right from the projection lens 12, a portion of the light distribution pattern P3 will be enlarged slightly to the right. Because of reason, the dark portion of the gap between the light distribution pattern P1 and the light distribution pattern P3 becomes bright, the overlapping portion between the light distribution pattern P2 and the light distribution pattern P3 becomes dark. This will reduce the light distribution unevenness of the short-distance region in the frontal direction of a vehicle in a road surface ahead of the vehicle.

Because the first horizontal plane 18*a*1 is formed with the ten grooves 30*a* that cause the light from the reflector 16 that has entered the first horizontal plane 18*a*1 to be reflected as the light that is diffused in the horizontal direction and to enter the projection lens 12, and that causes the light to be emitted forward as the light that is diffused in the horizontal direction from the projection lens 12, a portion of the light distribution pattern P1 will be enlarged on both the right and left. Because of this, the dark portion of the gap between the light distribution pattern P1 and the light distribution pattern P3 becomes bright. This will reduce the light distribution unevenness of the short-distance region in the frontal direction of a vehicle in a road surface ahead of the vehicle.

Because the second horizontal plane 18*a*2 is formed with the nine grooves 30*c* that causes the light from the reflector 16 that has entered the second horizontal plane 18*a*2 to be reflected as the light that is diffused in the horizontal direction and to enter the projection lens 12, and that causes the light to be emitted forward as the light that is diffused in the horizontal direction from the projection lens 12, a portion of the light distribution pattern P2 will be enlarged on both the right and left. Because of this, the portion where the light distribution pattern P2 and the light distribution pattern P3 overlap each other becomes dark. This will reduce light distribution unevenness of the short-distance region in the frontal direction of a vehicle in a road surface ahead of the vehicle.

As described in detail above, the lamp unit 10 of a vehicle headlamp according to one or more embodiments is constituted as a projector-type lamp unit 10 that uses the light-emitting element 14 as a light source. However, the mirror member 18 that has the upward reflecting surface 18*a* that upward reflects a portion of the reflected light from the reflector 16 and that is formed so that the front end edge 18*b* of the upward reflecting surface 18*a* may pass through the rear focal point F of the projection lens 12 is provided between the reflector 16 and the projection lens 12. Thus, it is possible to form the light distribution pattern P1 for low beams that has clear cut-off lines CL1, CL2, and CL3 at its upper end while the utilization efficiency of the light from the light-emitting element 14 can be enhanced.

In such a case, the self-lane region in the upward reflecting surface 18*a* is constituted with the first horizontal planes 18*a*1 including the optical axis Ax, and the opposite-lane region in the upward reflecting surface 18*a* is constituted with the middle slope 18*a*3 extending obliquely downward from the optical axis Ax and the second horizontal plane 18*a*2 extending parallel to the first horizontal plane 18_a_1 from the lower end edge of the middle slope. However, because the diffusing and reflecting portion 30 that diffuses and reflects the reflected light from the reflector 16 is formed in a position apart from the front end edge 18_b_ of the upward reflecting surface 18_a_ in the middle slope 18_a_3 to the rear side, the following operation effects can be obtained.

That is, the light distribution pattern P3 formed by the light reflected by the middle slope 18_a_3 in the upward reflecting surface 18_a_ of the mirror member 18 is formed so as to be obliquely interposed between the two light distribution patterns P1 and P2 formed by the light reflected by the first and second horizontal planes 18_a_1 and 18_a_2. However, a portion of the middle slope 18_a_3 is formed as the diffusing and reflecting portion 30. Thus, by widening the light distribution pattern P3 formed by the reflected light from the middle slope 18_a_3, the brightness of the pattern can be reduced. Accordingly, it is possible to reduce the probability that light distribution unevenness may be caused in the light distribution pattern P1 for low beams by a light distribution pattern formed by the reflected light from the mirror member 18.

In such a case, because the diffusing and reflecting portion 30 is formed in a position apart from the front end edge 18_b_ of the upward reflecting surface 18_a_ in the middle slope 18_a_3 to the rear side, occurrence of light distribution unevenness can be suppressed without causing a hindrance to formation of the cut-off lines CL1, CL2, and CL3.

As described above, according to one or more embodiments, when the light distribution pattern for low beams that has the cut-off lines CL1, CL2, and CL3 with a right-and-left height difference is formed by the projector-type lamp unit 10 that uses the light-emitting element 14 as a light source, occurrence of light distribution unevenness can be suppressed.

Moreover, in one or more embodiments, the diffusing and reflecting portion 30 is formed so as to extend to the first and second horizontal planes 18_a_1 and 18_a_2 such that it bridges over the middle slope 18_a_3 in the vehicle width direction. Thus, the light distribution pattern P3 formed by the reflected light from a portion of the middle slope 18_a_3 and the light distribution pattern P1 or P2 formed by the reflected light from a portion of each of the first and second horizontal planes P1 and P2 can be made to partially overlap each other while the brightness of the patterns can be reduced. This makes it possible to effectively suppress occurrence of light distribution unevenness.

Further, in one or more embodiments, the diffusing and reflecting portion 30 is configured by forming a plurality of grooves 30_a_, 30_b_, and 30_c_ extending in the front and rear directions so as to be adjacent to one another in the vehicle width direction. Thus, the reflected light from each of the grooves 30_a_, 30_b_, and 30_c_ can be made into horizontally diffused light. Because of this, a light distribution pattern formed by the reflected light from a portion of the middle slope 18_a_3 and a light distribution pattern formed by the reflected light by a portion of each of the first and second horizontal planes 18_a_1 and 18_a_2 can be made into a laterally long light distribution pattern. This makes it possible to more effectively suppress occurrence of light distribution unevenness.

Furthermore, in one or more embodiments, the groove 30_b_ located in the middle slope 18_a_3 has upward slope 30_b_1 that is inclined to the side opposite to the middle slope 18_a_3. Thus, the following operation effects can be obtained.

If the diffusing and reflecting portion 30 is not formed, a gap will be formed between the light distribution pattern P1 formed by the reflected light from the first horizontal plane 18_a_1 and the light distribution pattern P3 formed by the reflected light from the middle slope 18_a_3, and the gap portion will become a dark portion. On the other hand, if the groove 30_b_ located in the middle slope 18_a_3 is configured so as to have the upward slope 30_b_1 that is inclined to the side opposite to the middle slope 18_a_3, the reflected light from the upward slope 30_b_1 of the groove 30_b_ can be diffused in a direction nearer the light distribution pattern P1 formed by the reflected light from the first horizontal plane 18_a_1. This can prevent a gap from being formed with respect to the light distribution pattern P3 formed by the reflected light from the middle slope 18_a_3, and thereby can prevent the gap portion from becoming a dark portion. This makes it possible to more effectively suppress occurrence of light distribution unevenness. In addition, because each groove 30_a_ located in the first horizontal plane 18_a_1 has the upward slope 30_a_1 that is inclined to the side opposite the middle slope 18_a_3, and each groove 30_c_ located in the second horizontal plane 18_a_2 has the upward slope 30_c_1 that is inclined to the same side as the middle slope 18_a_3, the following operation effects can be obtained.

In the reflected light from the reflector 16, the reflected light from a reflection region in a position apart from the optical axis Ax in the vehicle width direction will have a large incident angle to the upward reflecting surface 18_a_ of the mirror member 18 in plan view. In such a case, the reflected light from the reflection region of the reflector is 16 that is located on the side of the first horizontal plane 18_a_1 with respect to the optical axis Ax mainly enters the first horizontal plane 18_a_1, and the reflected light from the reflection region of the reflector 16 located on the side of the second horizontal plane 18_a_2 with respect to the optical axis mainly enters the second horizontal plane 18_a_2. Thus, by constituting each groove 30_a_ located in the first horizontal plane 18_a_1 as a groove having the upward slope 30_a_1 that is inclined to the side opposite the middle slope 18_a_3, and by constituting each groove 30_c_ located in the second horizontal plane 18_a_2 as a groove having the upward slope 30_c_1 that is inclined to the same side as the middle slope 18_a_3, the reflected light can be made to enter the projection lens 12 irrespective of whether the reflected light from each of the grooves 30_a_ and 30_c_ becomes horizontally diffused light. This makes it possible to suppress occurrence of a light distribution pattern as well as to effectively utilize the luminous flux of a light source.

Further, in one or more embodiments, the position of the front end edge of the diffusing and reflecting portion 30 is set to the position of 1 to 4 mm from the rear focal point F of the projection lens 12. Thus, the light that is directed to a relatively short-distance region (that is, a region where light distribution unevenness is conspicuous) in the frontal direction of a vehicle can be diffused, and, thereby, occurrence of light distribution unevenness can be suppressed effectively. Further, because the portion of the upward deflecting surface 18_a_ located in front of the diffusing and reflecting portion 30 ensures the function as the upward deflecting surface 18_a_, the cut-off lines CL1, CL2, and CL3 formed from the front end edge 18_b_ of the upward reflecting surface 18_a_ can be formed clearly.

In addition, although the description of the above embodiments has been made about the case where the downward inclination angle of the middle slope 18_a_3 is set to 15°, even if the inclination angle is set to angles other than the above angle, the same operation effect as the above embodiments can be obtained by the configuration in which the diffusing and reflecting portion 30 is formed.

Although the description has been made about cases where the light-emitting chip 14_a_ of the light-emitting element 14 has a square light-emitting surface of 1 mm×1 mm, a configuration which the light-emitting chip has a light-emitting surface of other shapes or sizes than the above ones can also be adopted, and a plurality of the light-emitting chips 14*a* can also be arranged adjacent to one another.

Moreover, although the description of the above embodiments has been made about cases where the upward reflecting surface 18*a* is formed so as to rearward extend along the optical axes Ax from the position of the rear focal point F, it is also possible to adopt a configuration in which the upward reflecting surface 18*a* is formed in a slightly (for example, about 1.5°) front lower direction with respect to the longitudinal direction of a vehicle. By adopting such a configuration, a mold can be easily extracted when the mirror member 18 is molded, and more of the reflected light from the reflector 16 reflected by the upward reflecting surface 18*a* can be made to enter the projection lens 12.

In addition, the numeric values shown as dimensional data in the above embodiments are just illustrative, and it is natural that the values may be set to suitably different values.

While description has been made in connection with embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

REFERENCE NUMERALS

10: LAMP UNIT
12: PROJECTION LENS
14: LIGHT-EMITTING ELEMENT
14*a*: LIGHT-EMITTING CHIP
14*b*: SUBSTRATE
16: REFLECTOR
16*a*: REFLECTING SURFACE
18: MIRROR MEMBER
18A: LENS HOLDER
18B: REAR EXTENSION PORTION
18*a*: UPWARD REFLECTING SURFACE
18*a*1: FIRST HORIZONTAL PLANE
18*a*2: SECOND HORIZONTAL PLANE
18*a*3: MIDDLE SLOPE
18*b*: FRONT END EDGE
30: DIFFUSING AND REFLECTING PORTION
30*a*, 30*b*, 30*c*: GROOVE
30*a*1, 30*b*1, 30*c*1: UPWARD SLOPE
Ax: OPTICAL AXIS
CL1: OPPOSITE-LANE CUT-OFF LINE
CL2: SELF-LANE CUT-OFF LINE
CL3: OBLIQUE CUT-OFF LINE
E: ELBOW POINT
F: REAR FOCAL POINT
HZ: HOT ZONE
P1, P1', P2, P2', P3, P3': LIGHT DISTRIBUTION PATTERN
PL: LIGHT DISTRIBUTION PATTERN FOR LOW BEAMS

What is claimed is:

1. A lamp unit of a vehicle lamp comprising:

a projection lens arranged on an optical axis extending in the longitudinal direction of a vehicle;

a light-emitting element arranged so as to face upward behind a rear focal point of the projection lens and in the vicinity of the optical axis;

a reflector arranged so as to cover the light-emitting element from above and to reflect light from the light-emitting element forward toward the optical axis; and a mirror member disposed between the reflector and the projection lens, the mirror member comprising an upward reflecting surface that upward reflects a portion of the reflected light from the reflector, and a front end edge formed so as to pass through a portion in the vicinity of the rear focal point of the projection lens, wherein a region of the upward reflecting surface located nearer a self-lane side than the optical axis comprises a first horizontal plane including the optical axis, wherein a region of the upward reflecting surface located nearer an opposite-lane side than the optical axis comprises a middle slope extending obliquely downward from the optical axis and a second horizontal plane extending parallel to the first horizontal plane from a lower end edge of the middle slope, and wherein a diffusing and reflecting portion that diffuses and reflects the reflected light from the reflector is formed in a position of the middle slope that is apart from the front end edge of the upward reflecting surface to a rear side.

2. The lamp unit of a vehicle headlamp according to claim 1, wherein the diffusing and reflecting portion is formed so as to extend to the first and second horizontal planes so as to bridge over the middle slope in a vehicle width direction.

3. The lamp unit of a vehicle headlamp according to claim 1, wherein the diffusing and reflecting portion comprises a plurality of grooves extending in the longitudinal direction of the vehicle so as to be adjacent to one another in the vehicle width direction.

4. The lamp unit of a vehicle headlamp according to claim 3, wherein each of the grooves located in the middle slope among the plurality of grooves has an upward slope that is inclined to the side opposite the middle slope.

5. The lamp unit of a vehicle headlamp according to claim 4, wherein, among the plurality of grooves, each of the grooves located in the first horizontal plane has an upward slope that is inclined to the side opposite the middle slope, and each of the grooves located in the second horizontal plane has an upward slope that is inclined to the same side as the middle slope.

6. The lamp unit of a vehicle headlamp according to claim 1, wherein a position of the front end edge of the diffusing and reflecting portion is set to a position of 1 to 4 mm from the rear focal point of the projection lens.

7. The lamp unit of a vehicle headlamp according to claim 2, wherein the diffusing and reflecting portion comprises a plurality of grooves extending in the longitudinal direction of the vehicle so as to be adjacent to one another in the vehicle width direction.

8. The lamp unit of a vehicle headlamp according to claim 7, wherein each of the grooves located in the middle slope among the plurality of grooves has an upward slope that is inclined to the side opposite the middle slope.

9. The lamp unit of a vehicle headlamp according to claim 8, wherein, among the plurality of grooves, each of the grooves located in the first horizontal plane has an upward slope that is inclined to the side opposite the middle slope, and each of the grooves located in the second horizontal plane has an upward slope that is inclined to the same side as the middle slope.

10. The lamp unit of a vehicle headlamp according to claim 2, wherein a position of the front end edge of the diffusing and reflecting portion is set to a position of 1 to 4 mm from the rear focal point of the projection lens.

11. The lamp unit of a vehicle headlamp according to claim 3, wherein a position of the front end edge of the diffusing and reflecting portion is set to a position of 1 to 4 mm from the rear focal point of the projection lens.

12. The lamp unit of a vehicle headlamp according to claim 4, wherein a position of the front end edge of the diffusing and reflecting portion is set to a position of 1 to 4 mm from the rear focal point of the projection lens.

13. A method of manufacturing a lamp unit of a vehicle lamp comprising:

disposing a projection lens on an optical axis extending in the longitudinal direction of a vehicle, disposing a light-emitting element near the optical axis so as to face upward behind a rear focal point of the projection lens, and covering the light-emitting element from above with a reflector that reflects light from the light-emitting element forward toward the optical axis, disposing a mirror member between the reflector and the projection lens, the mirror member comprising an upward reflecting surface that upward reflects a portion of the reflected light from the reflector, and a front end edge formed so as to pass through the rear focal point of the projection lens, wherein a region of the upward reflecting surface located nearer a self-lane side than the optical axis comprises a first horizontal plane including the optical axis, wherein a region of the upward reflecting surface located nearer an opposite-lane side than the optical axis comprises a middle slope extending obliquely downward from the optical axis and a second horizontal plane extending parallel to the first horizontal plane from a lower end edge of the middle slope, and forming a diffusing and reflecting portion that diffuses and reflects the reflected light from the reflector in a position of the middle slope that is apart from the front end edge of the upward reflecting surface to the rear side.

14. The method according to claim 13, further comprising:

forming the diffusing and reflecting portion so as to extend to the first and second horizontal planes so as to bridge over the middle slope in a vehicle width direction.

15. The method according to claim 14, forming the diffusing and reflecting portion with a plurality of grooves extending in the longitudinal direction of a vehicle so as to be adjacent to one another in the vehicle width direction.

16. The method according to claim 15, wherein each of the grooves located in the middle slope among the plurality of grooves has an upward slope that is inclined to the side opposite the middle slope.

17. The lamp unit of a vehicle headlamp according to claim 16, wherein, among the plurality of grooves, each of the grooves located in the first horizontal plane has an upward slope that is inclined to the side opposite the middle slope, and each of the grooves located in the second horizontal plane has an upward slope that is inclined to the same side as the middle slope.

18. The lamp unit of a vehicle headlamp according to claim 13, wherein a position of the front end edge of the diffusing and reflecting portion is set to a position of 1 to 4 mm from the rear focal point of the projection lens.

* * * * *